United States Patent
Whalen

(10) Patent No.: US 12,358,409 B2
(45) Date of Patent: Jul. 15, 2025

(54) SEAT WITH NECK SUPPORT

(71) Applicant: Honda Motor Co., Ltd., Tokyo (JP)

(72) Inventor: Kelly M Whalen, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 18/359,726

(22) Filed: Jul. 26, 2023

(65) Prior Publication Data

US 2025/0033543 A1   Jan. 30, 2025

(51) Int. Cl.
| | |
|---|---|
| *B60N 2/806* | (2018.01) |
| *A47C 7/38* | (2006.01) |
| *B60N 2/80* | (2018.01) |
| *B60N 2/879* | (2018.01) |
| *B60N 2/885* | (2018.01) |
| *B60N 3/10* | (2006.01) |

(52) U.S. Cl.
CPC .................. *B60N 2/879* (2018.02)

(58) Field of Classification Search
CPC ...... A47C 7/383; A47C 16/00; A47G 9/1081; A47G 2009/1018; B60N 2/806; B60N 2/809; B60R 2021/2074
See application file for complete search history.

(56) References Cited

U.S. PATENT DOCUMENTS

| | | | | |
|---|---|---|---|---|
| 5,330,255 | A | | 7/1994 | Stawicki |
| 6,158,812 | A * | 12/2000 | Bonke | ............... B60N 2/818 297/216.12 |
| 6,474,733 | B1 * | 11/2002 | Heilig | ............... B60N 2/914 297/216.12 |
| 8,448,275 | B1 * | 5/2013 | Leach | ............. A47C 27/086 5/655 |
| 9,481,277 | B1 * | 11/2016 | Ruelas | ................ B60N 2/853 |
| 10,525,858 | B2 * | 1/2020 | Hickman Guevara | ............... B60N 3/106 |
| 2009/0307846 | A1 * | 12/2009 | Eura | .................. A47G 9/10 5/636 |
| 2015/0182044 | A1 | 7/2015 | Fan | |
| 2015/0197170 | A1 | 7/2015 | Obukhov | |
| 2015/0203008 | A1 * | 7/2015 | Wang | ............... B60N 2/809 297/406 |
| 2016/0296031 | A1 * | 10/2016 | Sramek | ................ A61F 5/56 |
| 2017/0251813 | A1 * | 9/2017 | Komsky | ............... A47C 7/383 |
| 2018/0065793 | A1 * | 3/2018 | Baker | ................ A45C 3/001 |

(Continued)

FOREIGN PATENT DOCUMENTS

| | | |
|---|---|---|
| CN | 201894442 U | 7/2011 |
| CN | 204998384 U | 1/2016 |

(Continued)

*Primary Examiner* — Shin H Kim
(74) *Attorney, Agent, or Firm* — Clifford B Vaterlaus; American Honda Motor Co., Inc.

(57) ABSTRACT

A neck support system includes a seat having a seatback and a headrest positioned on an upper portion of the seatback. A neck bolster is movable from a stowed position to a deployed position. In the deployed position, the neck bolster provides neck support for the occupant of the seat. The seat has a cavity accessible between the seatback and the headrest, and the neck bolster fits in the cavity in the stowed position. When the neck bolster is in the stowed position and the headrest is positioned against the upper portion of the seatback, the neck bolster is hidden from view.

16 Claims, 6 Drawing Sheets

(56) References Cited

U.S. PATENT DOCUMENTS

2018/0146807 A1*  5/2018  Silver .................. A47G 9/1009
2019/0200773 A1*  7/2019  Komsky ................ A47C 16/00

FOREIGN PATENT DOCUMENTS

| | | |
|---|---|---|
| CN | 206086461 U | 4/2017 |
| DE | 202005005070 U1 | 6/2005 |
| JP | 3922259 B2 | 5/2007 |
| KR | 200342389 Y1 | 2/2004 |
| KR | 20100004029 U | 4/2010 |
| KR | 20120001742 U | 3/2012 |
| KR | 20130001335 U | 2/2013 |

* cited by examiner

SEAT WITH NECK SUPPORT

BACKGROUND

The disclosed subject matter relates generally to seats. More particularly, the disclosed subject matter relates to seats incorporating neck support systems.

Traditional headrests, or head restraints, on seats are adjustable up and down, and in the fore aft directions. The main purpose of headrests on vehicle seats is to protect the head and neck of the seat occupant in the event of a crash. The headrests are not always configured for optimal comfort in all use conditions. Some rear vehicle seats have a pillow attached to the front of the headrest to improve comfort. However, some such pillow arrangements may impact the performance of the seats.

It is common for vehicle occupants to rest or sleep in a vehicle while the vehicle is parked or if the occupants are not driving the vehicle. Passengers of autonomous vehicles may also desire to rest comfortably while traveling. When resting in a vehicle with the traditional seats, an occupant's neck may not be adequately supported, and the headrest position may not provide good support for resting or sleeping. Some known applications of neck supports contain a mechanism within the headrest that utilizes the shape and form change of the main surface of the headrest to provide additional support. These arrangements may be expensive to manufacture and may affect the appearance, comfort, and potentially the safety of the headrest.

It would therefore be desirable to provide a neck support system for seats that is comfortable and that requires minimal materials, mechanical parts, hardware, and electronics to construct and operate. It would also be desirable to provide a neck support system that is easy to understand and simple to operate. Additionally, it would be desirable to provide a neck support system that is completely concealed when stowed, and that provides the appearance, feeling, and function of a typical headrest. For example, it would be beneficial to provide a neck support in which the headrest has no break lines, gaps, or hard surfaces or edges impacting the general styling surfaces of the headrest, and one in which the shape or form of the headrest itself does not change. It would also be desirable to provide a neck support system with a neck bolster that is attached to the seat so that it cannot be lost, and so that it can be located within reach of the seat occupant. In such arrangement, the neck bolster can always be available on-demand as opposed to similar head restraint "pillows" or neck supports that can be easily misplaced. It would also be desirable to provide a neck support system for a seat that does not negatively impact the functionality of the seat.

SUMMARY

In accordance with one embodiment of the present disclosure, a neck support system includes a seat having a seatback and a headrest positioned on an upper portion of the seatback. A neck bolster is movable from a stowed position to a deployed position. The seat has a cavity accessible between the seatback and the headrest, and the neck bolster fits in the cavity in the stowed position. When the neck bolster is in the stowed position and the headrest is positioned against the upper portion of the seatback, the neck bolster is hidden from view.

In accordance with another embodiment of the present disclosure, a neck support system includes a seat having a seatback and a headrest positioned on an upper portion of the seatback. A neck bolster is movable from a stowed position to a deployed position. The headrest has a cavity, and the neck bolster compresses to fit in the cavity in the stowed position. The neck bolster expands to a size larger than the cavity when removed from the cavity in the deployed position.

In accordance with yet a further embodiment of the present disclosure, a neck support system includes a seat having a seatback and a headrest positioned on an upper portion of the seatback. The headrest has a lower surface for facing an upper surface of the seatback. The seat has a forward facing surface and a rearward facing surface. A neck bolster is movable from a stowed position to a deployed position. The seat has a cavity accessible between the seatback and the headrest, and the neck bolster fits in the cavity in the stowed position. The neck bolster is joined to the seat at a connection positioned between the forward facing surface and the rearward facing surface so that the neck bolster extends from the connection to a position in front of the forward facing surface and between the lower surface of the headrest and the upper surface of the seatback when the neck bolster is in the deployed position.

Other systems, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-12, wherein like numbers indicate the same or corresponding elements throughout the views.

Figure 1:
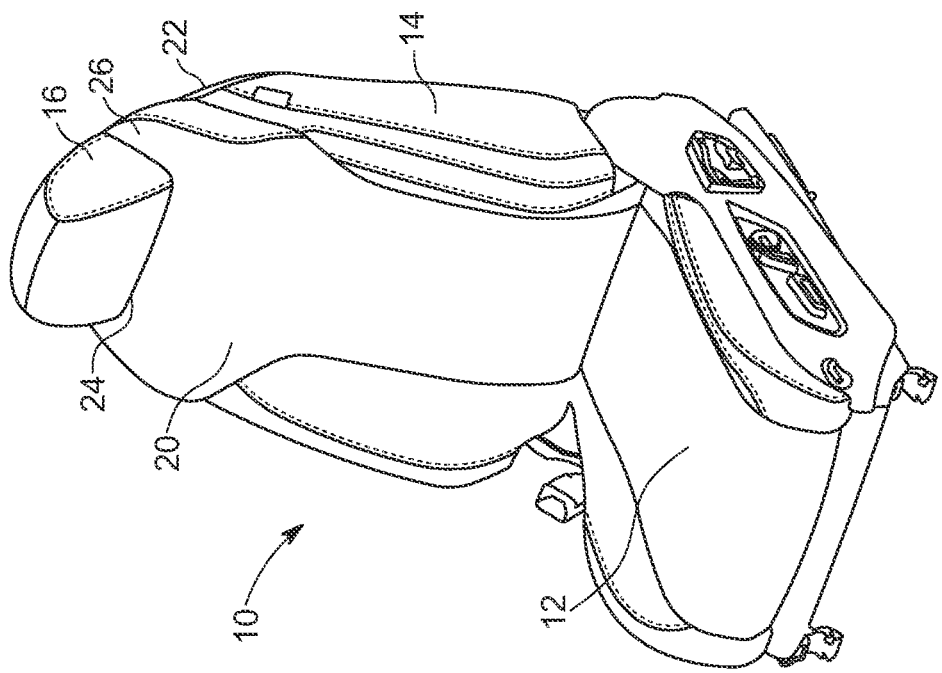
FIG. 1 is a front perspective view depicting a seat in accordance with one embodiment of the present disclosure.

FIG. 1 illustrates a perspective view of a seat, indicated generally at 10, in accordance with one embodiment of the present disclosure. The seat 10 is shown as a vehicle seat. However, other types of seats may be used in accordance with the principles of the present disclosure.

Figure 2:
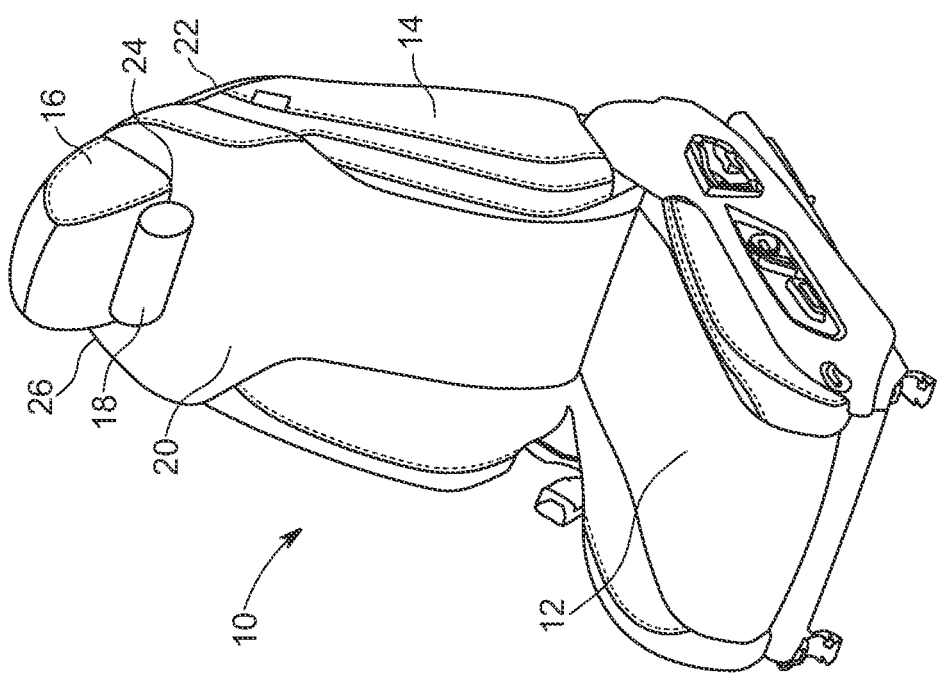
FIG. 2 is a front perspective view of the seat of FIG. 1 with a neck bolster in a deployed position.

The seat 10 may include a seat bottom 12, a seatback 14 and a headrest 16 positioned on an upper portion of the seatback 14. The seat 10 may also include a neck bolster 18 as shown in FIG. 2, which depicts a front perspective view of the seat 10 with the neck bolster 18 in a deployed position. The neck bolster 18 may be sized, shaped and positioned to provide additional support to the neck of an occupant of the seat 10. One embodiment of the neck bolster 18 may be substantially cylindrical in shape to meet a seat occupant's neck when the occupant leans back into the upper area of the seatback 14 and the headrest 16. It will be appreciated however, that the neck bolster 18 can have various different configurations within the scope of the present disclosure.

The seatback 14 may have a forward facing surface 20, a rearward facing surface 22, and an upper surface 26. The headrest 16 may have a lower surface 24 configured to face or contact the upper surface 26 of the seatback 14. When the neck bolster 18 is deployed, the neck bolster 18 extends to a position in front of the forward facing surface 20 and between the lower surface 24 of the headrest 16 and the upper surface 26 of the seatback 14.

Figure 3:
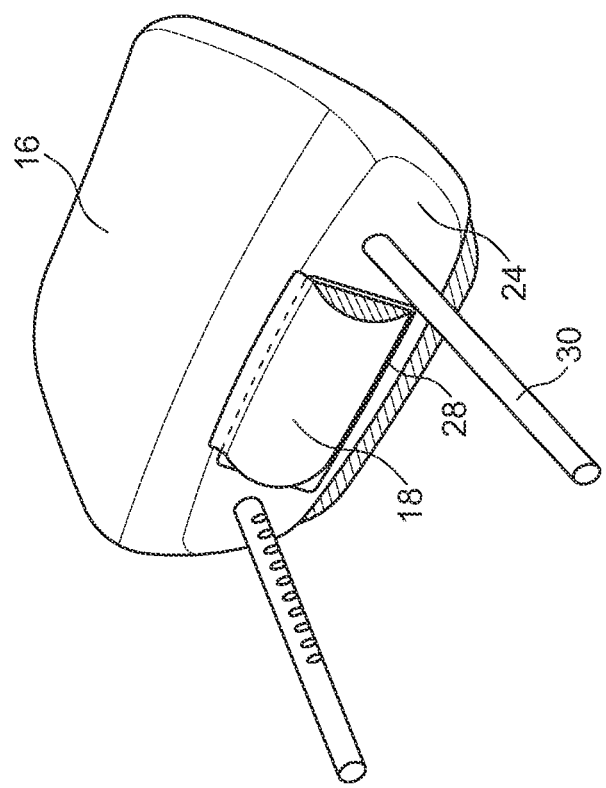
FIG. 3 is a bottom perspective view of a headrest and a neck bolster in a stowed position in accordance with one embodiment of the present disclosure.
Figure 4:
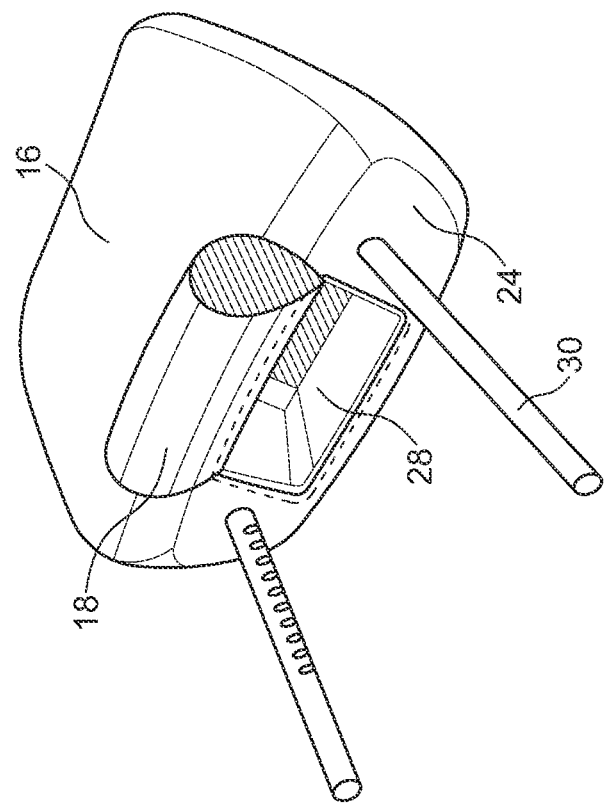
FIG. 4 is a bottom perspective view of the headrest of FIG. 3 and the neck bolster in a deployed position.

As shown in FIGS. 3 and 4, which depict bottom perspective views of a headrest 16 and neck bolster 18, the headrest 16 may include a cavity 28 accessible from an underside of the headrest 16. The neck bolster 18 may be stored in the cavity 28 in a stowed position as shown in FIG. 3. When desired to use the neck bolster 18, the neck bolster 18 can be removed from the cavity 28 to the deployed position, as shown in FIG. 4. The headrest 16 may also include a headrest frame 30 for joining the headrest 16 to the seatback 14 in a manner known to those skilled in the art.

Figure 5:
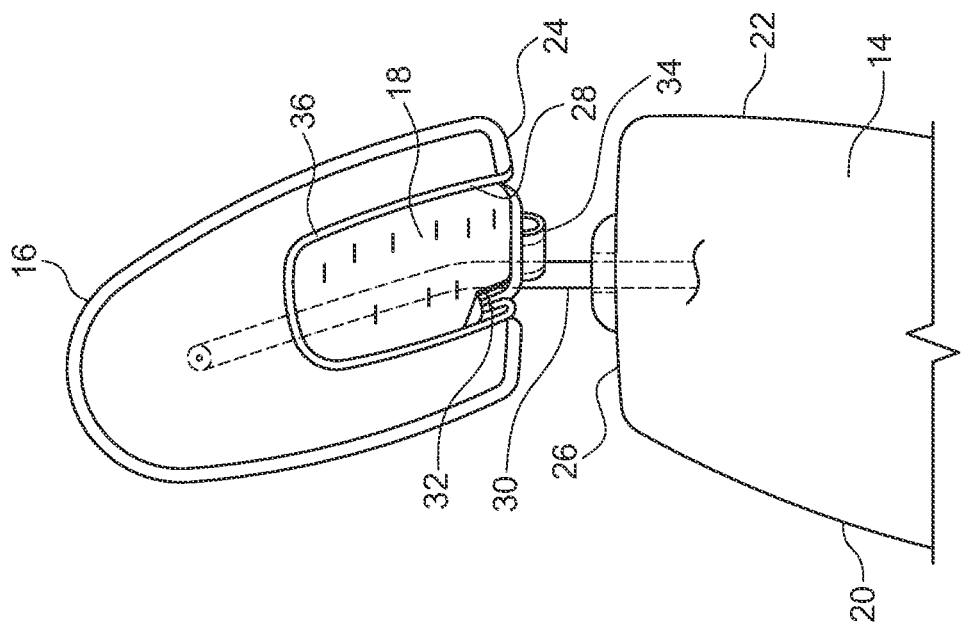
FIG. 5 is a schematic side sectional view of a portion of a seat showing a neck bolster in a stowed position.
Figure 6:
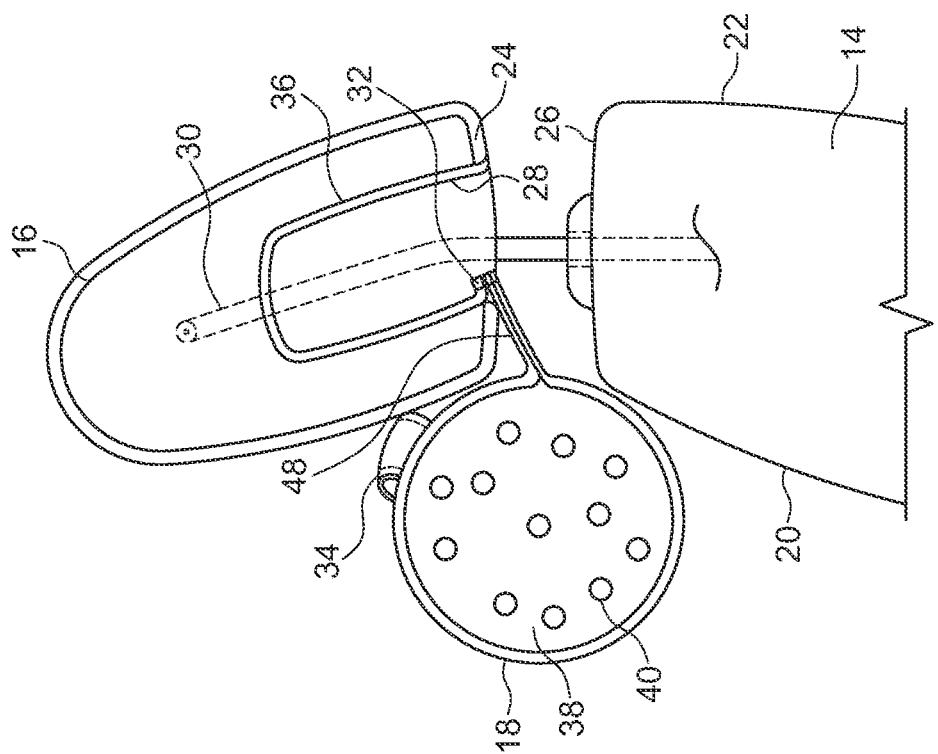
FIG. 6 is a schematic side sectional view of a portion of a seat showing the embodiment of the neck bolster of FIG. 5 in a deployed position.

Referring to FIGS. 5 and 6, schematic side sectional views of a portion of the seat 10 are shown. FIG. 5 shows the neck bolster 18 in the stowed position, whereas FIG. 6 depicts the neck bolster 18 in the deployed position. As shown in FIG. 5, the neck bolster 18 can be compressed to fit in the cavity 28. When the neck bolster 18 is removed from the cavity 28, the neck bolster 18 can expand to encompass a volume larger than that of the cavity 28. To allow the neck bolster 18 to compress and expand, the neck bolster 18 may be formed of a highly compressible foam material, for example. Accordingly, some embodiments of the neck bolster may be configured to expand to twice the volume of the cavity 28, or more.

Figure 7:
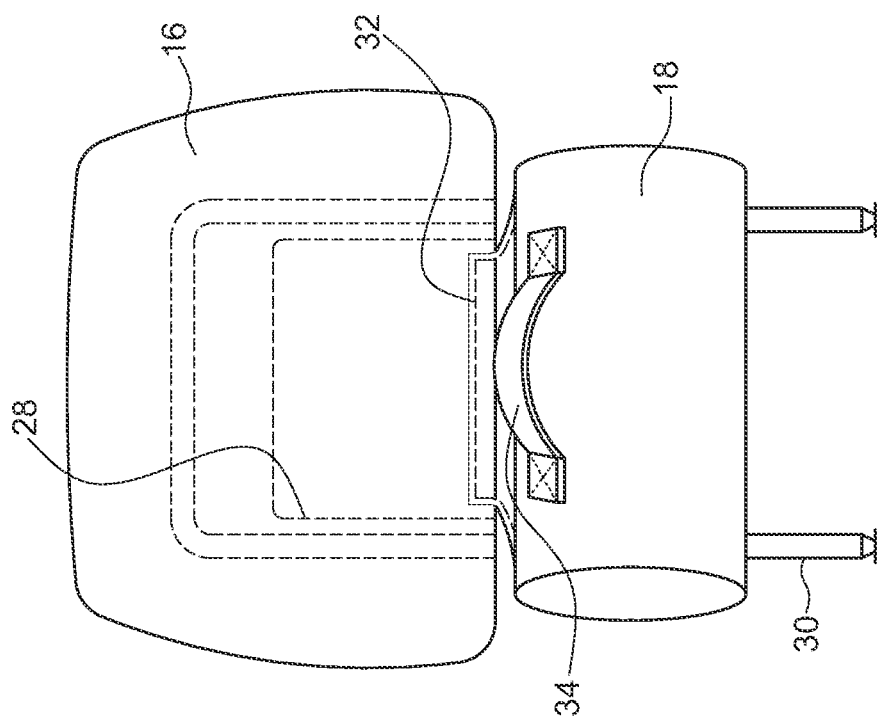
FIG. 7 is a front view of a headrest and a neck bolster in a deployed position.

The neck bolster 18 may be joined to the headrest 16 along a connection 32 extending in a width direction of the seat 10, as shown most clearly in FIGS. 6 and 7. The connection 32 may be positioned between the forward facing surface 20 of the seatback 14 and the rearward facing surface 22 of the seatback 14. The neck bolster 18 may be sewn, for example, to the headrest 16 along the connection 32. However, it will be understood that other methods of joining may be used. In such arrangement, the neck bolster 18 can be configured to rotate about the connection 32 when the neck bolster 18 moves from the stowed position to the deployed position, and from the deployed position to the stowed position.

To facilitate removing the neck bolster 18 from the cavity 28, a handle 34 may be provided on the neck bolster 18. For example, the handle 34 may be formed as a strap with both ends sewn or otherwise attached on an outer surface of the neck bolster 18 as shown most clearly in FIG. 7. Accordingly, when the headrest 16 is raised above the seatback 14, a user may reach underneath the headrest 16 to grasp the handle 34 and pull the neck bolster 18 between the headrest 16 and the seatback 14 to a position in front of the forward facing surface 20 of the seatback 14 on the front side of the seat 10. The neck bolster 18 can thereby be positioned for use in supporting the occupant's neck. It will be appreciated that the handle 34 may have various different configurations, one of which will be described in greater detail below.

The headrest 16 may also include a cavity liner 36 on a surface of the cavity 28. The cavity liner 36 may be formed of a material to provide a low friction surface to aid in insertion and removal of the neck bolster 18 from the cavity 28. One embodiment of the cavity liner 36 may include a fabric material that may be sewn or otherwise attached to the headrest trim cover. Alternatively, the cavity liner 36 may be molded in place during the headrest urethane mold foaming process. Additionally, the cavity liner 36 may be a plastic injection molded component and may be inserted in the headrest foam mold. Accordingly, some embodiments of the cavity liner 36 may provide structural integrity to the headrest 16, which may be particularly beneficial when the cavity 28 is empty.

Referring to FIG. 7, which depicts a front view of the headrest 16 and neck bolster 18 in a deployed position, the dimension of the neck bolster 18 may also expand in a width direction of the seat when the neck bolster 18 is removed from the cavity 28 such that the neck bolster 18 has a longitudinal dimension that is greater than that of the cavity 28 to provide a larger support area for the occupant of the seat 10.

Figure 8:
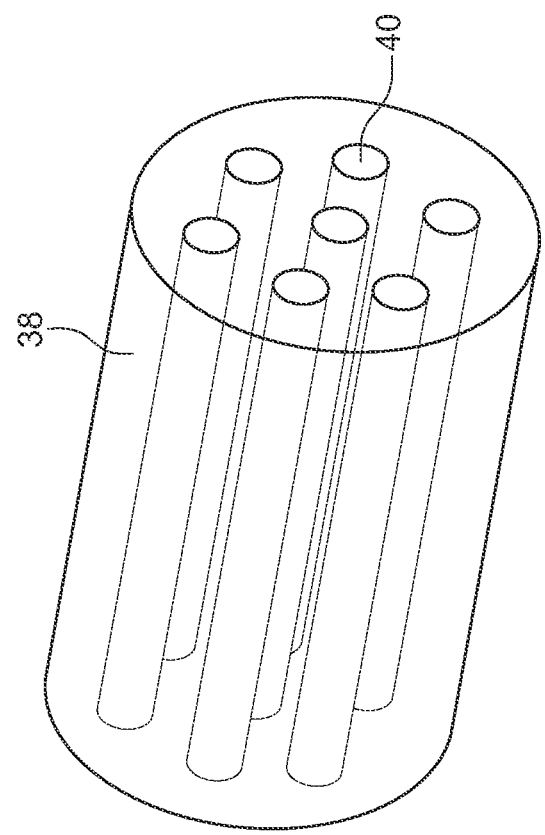
FIG. 8 is a perspective view of an internal portion of a neck bolster in accordance with one embodiment of the present disclosure.

FIG. 8 shows a perspective view of one embodiment of an internal portion 38 of the neck bolster 18. The internal portion 38 may be covered by any suitable covering, such as fabric, vinyl, leather or the like to form the neck bolster 18. The internal portion 38 may be formed of a polyurethane foam material and may have air voids 40 to increase the ability of the neck bolster 18 to compress to a smaller size. The air voids 40 can be arranged in a variety of different shapes, sizes or patterns to provide the desired compression and expansion characteristics. Similarly, the urethane foam formula properties of hardness and density may be specified to also improve the compressed and expanded size. Both hardness and density may be tuned to balance the compressibility of the neck bolster 18 for the stowed position and the support characteristics of the neck bolster 18 in the deployed position.

Figure 9:
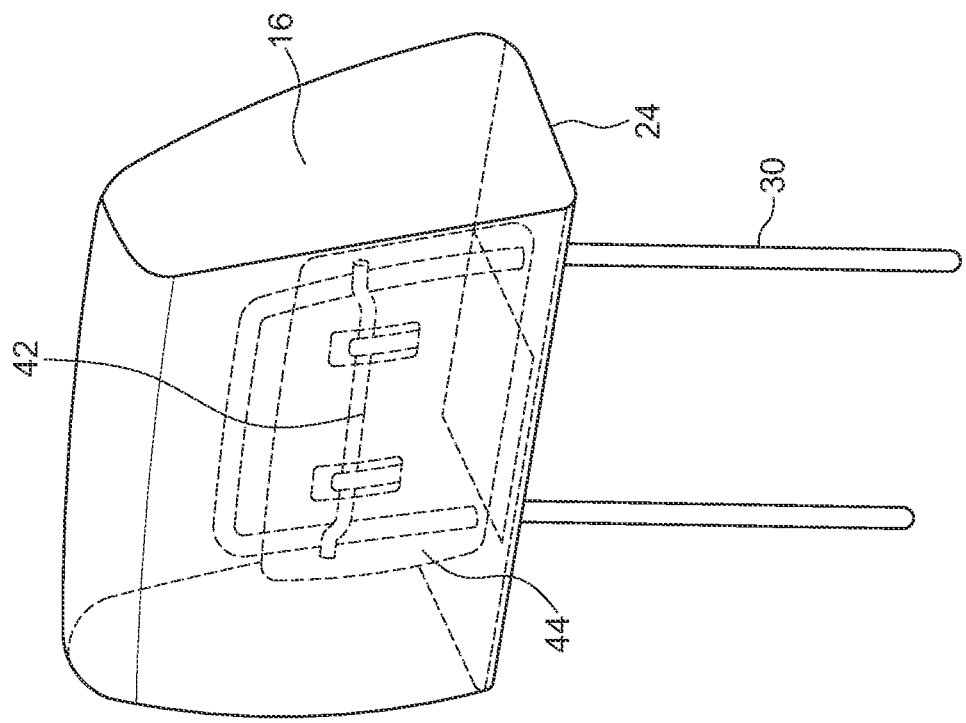
FIG. 9 is a front perspective view of a headrest with interior portions shown in dashed lines in accordance with one embodiment of the present disclosure.
Figure 10:
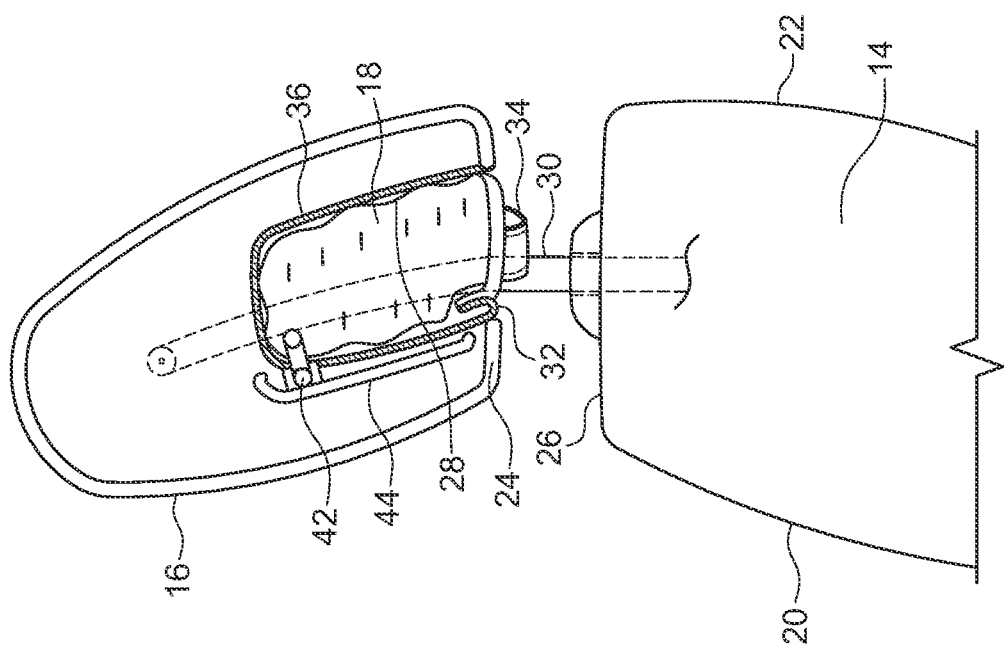
FIG. 10 is a schematic side sectional view of a portion of a seat showing the headrest of FIG. 9 and a neck bolster in a stowed position.

Referring now to FIG. 9, which discloses a front perspective view of an alternative embodiment of the headrest 16 with interior portions shown in dashed lines, and FIG. 10, which depicts a schematic side sectional view of a portion of the seat 10 showing the headrest 16 of FIG. 9 and the neck bolster 18 in a stowed position. The embodiment of the headrest 16 shown in FIGS. 9 and 10 may include a reinforcement member 42 joined to the headrest frame 30 and extending in front of the cavity 28. The reinforcement member 42 may be a steel wire, for example, that may be welded or otherwise joined to the headrest frame 30 in a manner known to those skilled in the art. The reinforcement member 42 may be configured to maintain the integrity of the headrest 16 when the neck bolster 18 is deployed and the cavity 28 is empty. Likewise, the reinforcement member 42 may be configured to provide additional support and load distribution during an impact.

The embodiment of the disclosure shown in FIGS. 9 and 10 may also include a reinforcement plate 44 joined to the reinforcement member 42 positioned in front of the cavity 28. The reinforcement plate 44 may be formed of any suitable material, such as plastic, metal, composite materials, or the like, and may be configured to further maintain the integrity of the headrest 16 when the neck bolster 18 is deployed and the cavity 28 is empty. The reinforcement plate 44 may also be configured to provide additional support and load distribution of the head/hands during user contact. One embodiment of the reinforcement plate 44 may be formed by plastic injection molding. Moreover, the reinforcement plate 44 may be placed into the headrest foam mold and molded in place.

It will be understood that some embodiments of the present disclosure may be provided without the reinforcement member 42, while other embodiments may include the reinforcement member 42 without the reinforcement plate 44. Additionally, some embodiments may include both the reinforcement member 42 and the reinforcement plate 44.

Figure 11:
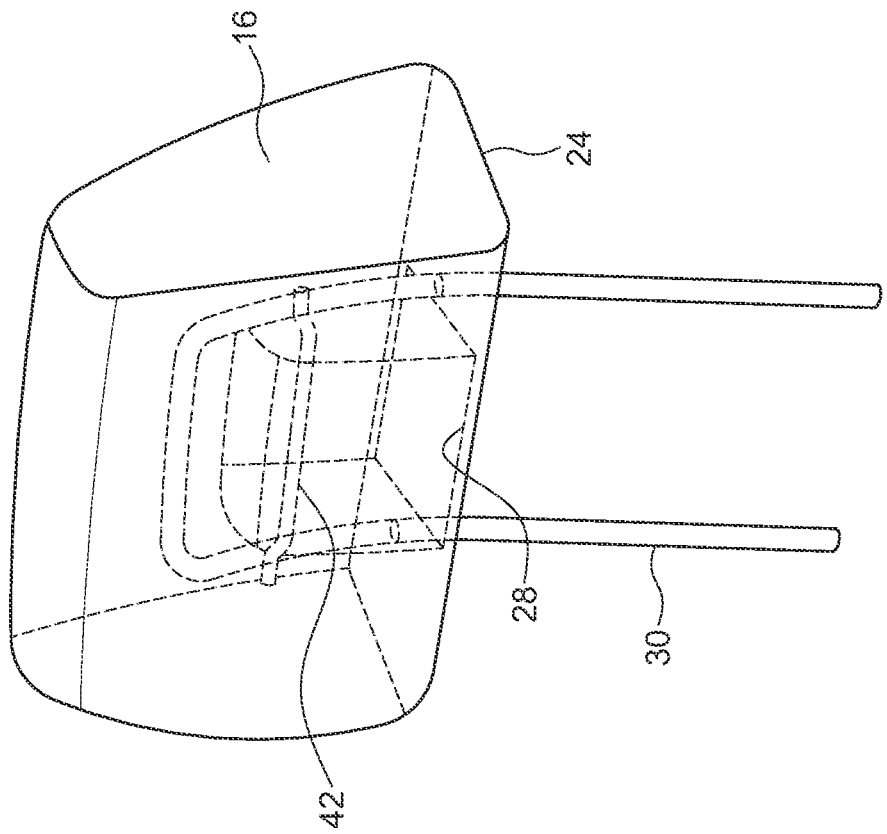
FIG. 11 is a front perspective view of an alternative embodiment headrest with interior portions shown in dashed lines in accordance with one embodiment of the present disclosure.
Figure 12:
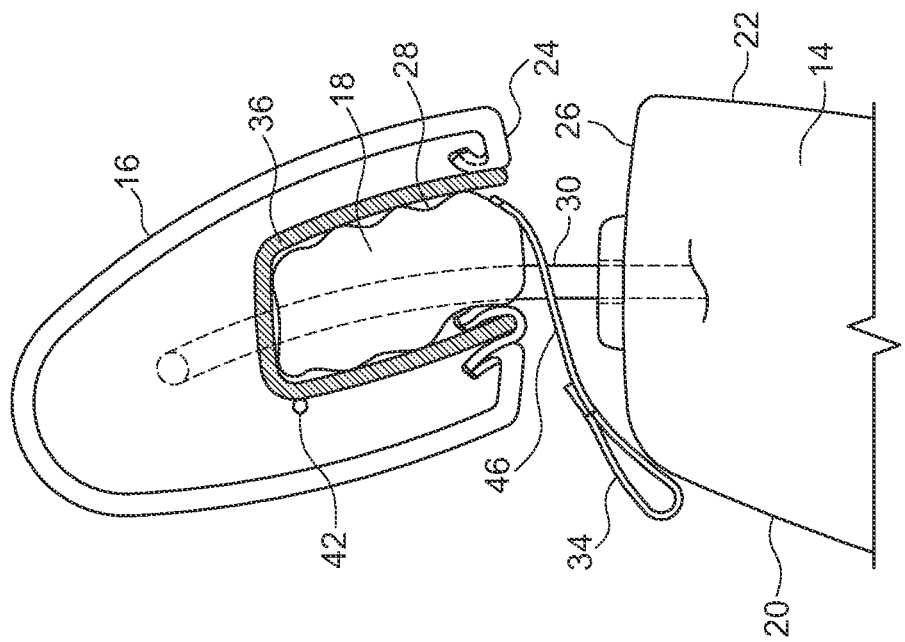
FIG. 12 is a schematic side sectional view of a portion of a seat showing the embodiment of the headrest of FIG. 11 and an alternative embodiment neck bolster in a stowed position.

For example, with reference to FIGS. 11 a front perspective view of an additional alternative embodiment is shown of the headrest 16 with interior portions shown in dashed lines. FIG. 12 depicts a schematic side sectional view of a portion of the seat 10 showing the headrest 16 of FIG. 11 and the neck bolster 18 in a stowed position. The embodiment of the headrest 16 depicted in FIGS. 11 and 12 includes the reinforcement member 42 without a reinforcement plate.

The embodiment of the neck bolster 18 depicted in FIG. 12 includes a handle in the form of a strap 46. The strap 46 may be joined to the neck bolster 18 at one end and may have a length to extend between the headrest 16 and the seatback 14 to either the forward facing surface 20 of the seatback 14, or the rearward facing surface 22 of the seatback 14. In this way, the strap 46 can be visible when the neck bolster 18 is in the stowed position and the headrest 16 is positioned against the seatback 14 to thereby serve as an indicator of the presence of the neck bolster 18. The strap 46 can also make it easier for a user to grasp and move the neck bolster 18 to the deployed position. To facilitate grasping the strap 46, one end of the strap 46 may include a loop or other type of grip. Moreover, the strap 46 can provide a visual indicator of the manner used to deploy the neck bolster 18.

In use, as shown in FIG. 1, when the neck bolster 18 is in the stowed position and the headrest 16 is positioned against the upper portion of the seatback 14, the neck bolster 18 is hidden from view. Accordingly, the appearance of the seat 10 is not altered by the neck bolster 18 when the neck bolster 18 is not in use. To move the neck bolster 18 to the deployed position, a user can lift the headrest 16 so that the headrest 16 is spaced apart from the seatback 14 thereby exposing the neck bolster 18. The user can then grasp the handle 34 and pull the neck bolster 18 between the lower surface 24 of the headrest 16 and the upper surface 26 of the seatback 14 to a position in front of the forward facing surface 20 of the seatback 14. The headrest 16 can then be lowered to hold the neck bolster 18 in place. Once the neck bolster 18 is removed from the cavity 28, the internal portion 38 of the neck bolster 18 expands to a size larger than the cavity 28. The neck bolster 18 can then be used to provide support to the neck of an occupant of the seat 10.

When the seat occupant no longer wants to use the neck bolster 18, the neck bolster 18 can be manually compressed, rotated, and stuffed into the cavity 28 in the underside of headrest 16 to the stowed position. Once the headrest 16 is lowered so that the lower surface 24 of the headrest 16 contacts the upper surface 26 of the seatback 14, the neck bolster 18 is hidden from view and the seat 10 has an appearance of a typical seat without the neck support system.

It will be appreciated that various alternative embodiments are contemplated within the scope of the present disclosure. For example, the drawings and description above disclose the cavity 28 in the headrest 16. However, it will be understood that an alternative embodiment of the present disclosure may include a cavity in the upper portion of the seatback 14. Accordingly, the neck bolster 18 could be stowed in the seatback 14 and function in a similar manner.

An additional alternative embodiment of the neck bolster 18 may include an adjustment member, such as a strap with a buckle, that allows the distance from the connection 32 to an end of the neck bolster 18 to be adjusted. The adjustment member may be positioned as indicated at element 48 in FIG. 6, for example. Thus, the position of the neck bolster 18 on the seat 10 can be modified to allow for enhanced comfort.

It will be understood that the present disclosure provides a neck support system for seats that is comfortable and that requires minimal materials, mechanical parts, hardware, and electronics to construct and operate. The present disclosure provides a neck support system that is simple for the seat occupant to understand and operate. Additionally, the present disclosure provides a neck support system that is completely concealed when stowed. Moreover, the present neck support system provides the appearance, feeling, and function of a typical seatback and headrest when the neck bolster is stowed. The disclosed neck support system provides a seat in which the headrest has no break lines, gaps, or hard surfaces or edges impacting the general styling surface of the headrest. Additionally, the shape or form of the headrest itself does not change to allow additional neck support when the neck bolster is deployed. Also, the neck bolster is attached to the seat so that it cannot be lost or located out of reach of the seat occupant. Therefore, the neck bolster can always be available on-demand as opposed to similar head restraint "pillows" or neck supports that can be easily misplaced. Also, the neck support system does not negatively impact the functionality of the seat.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A neck support system comprising:
a seat comprising a seatback and a headrest positioned on an upper portion of the seatback; and
a neck bolster movable from a stowed position to a deployed position;
wherein the seat has a cavity accessible between the seatback and the headrest, and the neck bolster fits in the cavity in the stowed position, wherein when the neck bolster is in the stowed position and the headrest is positioned against the upper portion of the seatback, the neck bolster is hidden from view; and
wherein the neck bolster comprises a handle to facilitate moving the neck bolster from the stowed position to the deployed position.

2. The neck support system of claim 1, wherein the cavity is disposed in the headrest.

3. The neck support system of claim 2, wherein the headrest comprises a cavity liner on a surface of the cavity.

4. The neck support system of claim 1, wherein the headrest comprises a headrest frame for joining the headrest to the seatback.

5. The neck support system of claim 4, wherein the headrest comprises a reinforcement member joined to the headrest frame and extending in front of the cavity.

6. The neck support system of claim 5, wherein the headrest comprises a reinforcement plate joined to the reinforcement member positioned in front of the cavity.

7. The neck support system of claim 1, wherein the handle comprises a strap that extends between the headrest and the seatback to a position on an exterior of the seat to indicate the presence of the neck bolster.

8. A neck support system comprising:
a seat comprising a seatback and a headrest positioned on an upper portion of the seatback; and
a neck bolster movable from a stowed position to a deployed position;
wherein the headrest has a cavity, and the neck bolster compresses to fit in the cavity in the stowed position, and the neck bolster expands to a size larger than the cavity when removed from the cavity in the deployed position;
wherein the neck bolster is joined to the headrest along a connection extending in a width direction of the seat; and
wherein the neck bolster rotates about the connection when the neck bolster moves from the stowed position to the deployed position.

9. The neck support system of claim 8, wherein the headrest comprises a cavity liner on a surface of the cavity.

10. The neck support system of claim 8, wherein the headrest comprises a headrest frame for joining the headrest to the seatback, and a reinforcement member is joined to the headrest frame, the reinforcement member extending in front of the cavity.

11. The neck support system of claim 10, wherein the headrest comprises a reinforcement plate joined to the reinforcement member positioned in front of the cavity.

12. The neck support system of claim 8, wherein the neck bolster comprises a handle to facilitate moving the neck bolster from the stowed position to the deployed position.

13. A neck support system comprising:
a seat comprising a seatback and a headrest positioned on an upper portion of the seatback, the headrest having a lower surface for facing an upper surface of the seatback, the seat having a forward facing surface and a rearward facing surface; and
a neck bolster movable from a stowed position to a deployed position;
wherein the seat has a cavity accessible between the seatback and the headrest, and the neck bolster fits in the cavity in the stowed position, wherein the neck bolster is joined to the seat at a connection positioned between the forward facing surface and the rearward facing surface so that the neck bolster extends from the connection to a position in front of the forward facing surface and between the lower surface of the headrest and the upper surface of the seatback when the neck bolster is in the deployed position; and
wherein the connection extends in a width direction of the seat, and the neck bolster rotates about the connection when the neck bolster moves from the stowed position to the deployed position.

14. The neck support system of claim 13, wherein the cavity is disposed in the headrest.

15. The neck support system of claim 13, wherein the neck bolster compresses to fit in the cavity in the stowed position, and the neck bolster expands to a size larger than the cavity when removed from the cavity in the deployed position.

16. The neck support system of claim 13,
wherein the neck bolster compresses to fit in the cavity in the stowed position, and the neck bolster expands to a size larger than the cavity when removed from the cavity in the deployed position;
wherein the cavity is disposed in the headrest, and when the neck bolster is in the stowed position and the headrest is positioned against the upper portion of the seatback, the neck bolster is hidden from view;
wherein the headrest comprises a cavity liner on a surface of the cavity and the headrest comprises a headrest frame for joining the headrest to the seatback,
a reinforcement member is joined to the headrest frame and extends in front of the cavity, and a reinforcement plate is joined to the reinforcement member positioned in front of the cavity; and
wherein the neck bolster comprises a handle to facilitate moving the neck bolster from the stowed position to the deployed position.

* * * * *